Patented Apr. 11, 1944

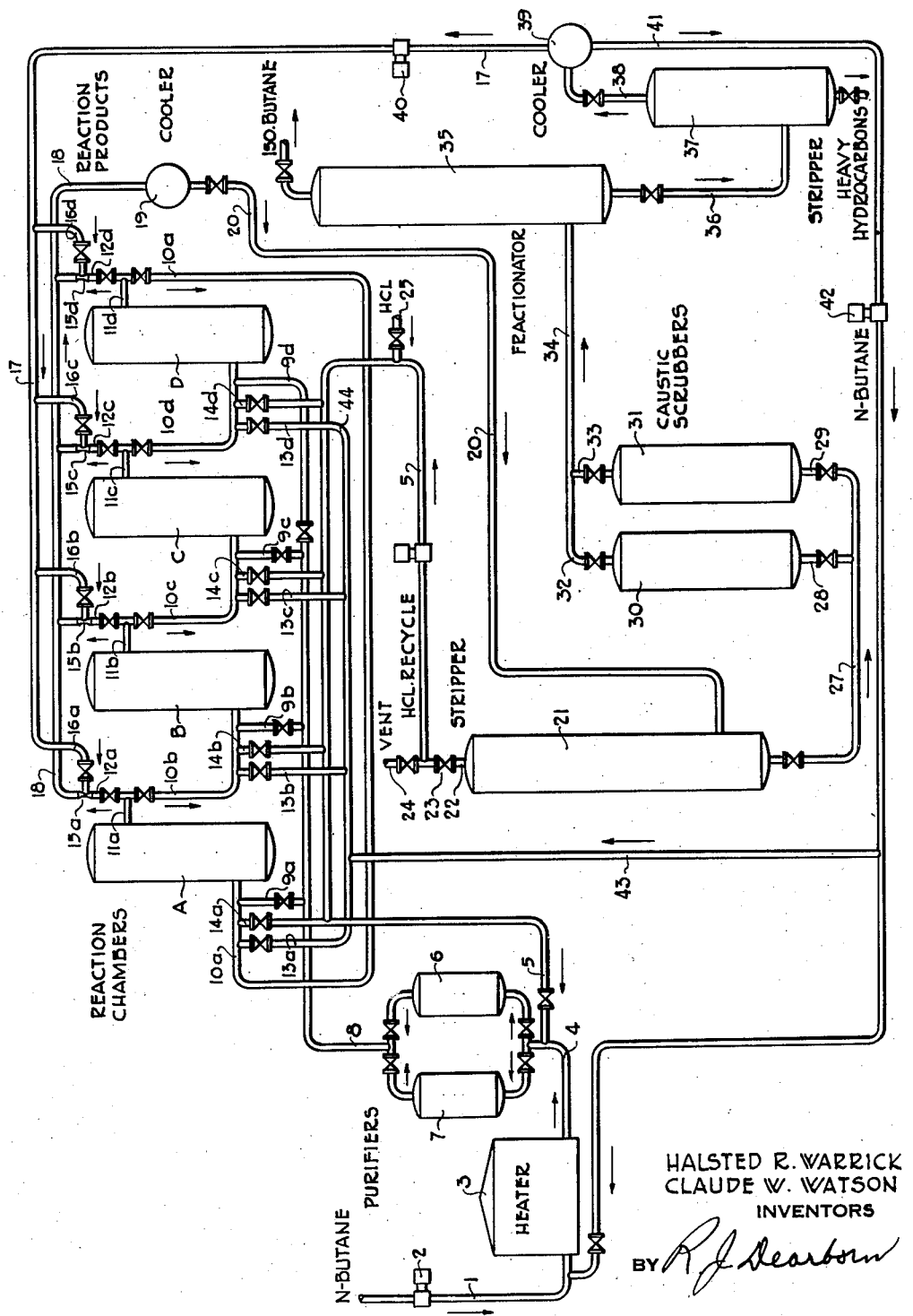

2,346,527

UNITED STATES PATENT OFFICE 2,346,527

ISOMERIZATION

Halsted R. Warrick, Teaneck, N. J., and Claude W. Watson, Tuckahoe, N. Y., assignors, by mesne assignments, to The Texas Company, New York, N. Y., a corporation of Delaware Application March 29, 1941, Serial No. 385,838

5 Claims. (Cl. 260—683.5)

This invention relates to the conversion of hydrocarbons, especially the isomerization of normal paraffins to isoparaffins. More particularly, the invention relates to an improved process for the isomerization of normal butane to isobutane.

It is the general object of the invention to provide improvements in the isomerization of normal paraffins to isoparaffins, particularly, normal butane to isobutane, which improvements are designed to make the process more efficient, principally in the direction of preventing shutdowns, control of conditions so as to maintain production despite change in catalytic activity, and efficient utilization of the raw materials employed.

Other objects of the invention in part will be obvious and in part will appear hereinafter.

It has been proposed to carry out the isomerization of normal paraffins in various ways. For example, it has been proposed to pass the feed hydrocarbons in either the liquid phase or the vapor phase in contact with an isomerization catalyst. As isomerization catalysts, it has been proposed to use metallic halides, such as aluminum chloride, aluminum bromide, iron chloride and zirconium chloride, together with a halogen-containing promoter for this type of catalyst such as the hydrogen halides, particularly hydrogen chloride, and alkyl chlorides or other compounds which in the presence of an aluminum halide yield a hydrogen halide. It has also been proposed to use as the catalyst an aluminum halide suspended in an aluminum halide-hydrocarbon complex. Probably the most familiar catalyst of this class is anhydrous aluminum chloride which may be employed in lump form. A valuable catalyst is also one consisting of an adsorbent material, especially an alumina, which may be bauxite or activated alumina, impregnated with aluminum chloride, the impregnation being effected by contacting lump alumina with aluminum chloride in the vapor or liquid phase.

In accordance with the present invention the isomerization of normal paraffins to isoparaffins, especially the isomerization of normal butane to isobutane, is carried out in a plurality of reaction zones in which the catalyst varies in activity and the promoter concentration is adjusted in the zones in accordance with the activity of the catalyst. As the process is preferably operated, the feed hydrocarbons are passed first through the zone containing the most active catalyst and then to the zone containing the next most active catalyst and so on. The reaction zones are preferably distinctly separate; for example, where they are contained in a single tower they are preferably separated by spaces free of catalyst. Ordinarily it is preferred to employ separate reaction chambers since the control of the temperature and other factors in the process is facilitated and problems of construction are reduced.

In the isomerization process it is important to obtain maximum conversion of normal paraffins to isoparaffins while retaining at the same time relatively long catalyst life. It appears, however, that where the conversion is relatively large, for example, a percent conversion above about 50 to 55 per cent by volume, side reactions occur which shorten catalyst life. Catalyst life also may be adversely affected by permitting a relatively large conversion in one reaction zone as compared with other reaction zones. In accordance with the present invention the rate of conversion and the activity of the catalyst are controlled in two ways which may be employed separately or simultaneously. The first method of control involves varying the concentration of the promoter in the hydrocarbons undergoing treatment in accordance with the activity of the catalyst. Thus, in the system described above only a small amount of promoter would be introduced into the feed hydrocarbons prior to contact with the most active catalyst in the first reaction zone and additional promoter would be added to the reaction mixture in or before entering the succeeding zones; the reaction mixture coming in contact with the weakest catalyst would therefore contain the highest percentage of promoter.

The activity of the catalyst is also affected by the temperature maintained in the reaction zone. In accordance with the invention the temperature is preferably controlled so that the lowest conversion temperature is maintained in the first zone, which contains the most active catalyst, and the highest temperature is maintained in the last zone, which contains the least active catalyst, although at certain stages in the process, it may be advantageous to maintain the same temperture in the several zones. Since the reaction is exothermic, the control is effected by cooling. In the present process the temperature is maintained at the desired point in each zone, and the maximum temperature is controlled by introducing cool hydrocarbons into the reaction mixture. Advantageously this introduction is effected between zones and the cool hydrocarbons employed are those separated by fractionation from the final reaction products.

Although in the present process any of the familiar isomerization catalysts may be employed it is preferred to use a catalyst which consists of an adsorbent support such as alumina, which may be in the activated form, pumice and the like impregnated with aluminum chloride, a catalyst consisting of alumina impregnated with aluminum chloride being especially preferred. In use this type of catalyst becomes spent at least in part due to the fact that the amount of aluminum chloride present is reduced through sublimation. While the catalyst may be regenerated by contacting it with additional vapors of aluminum chloride, eventually regeneration of the catalyst is no longer feasible. In the present process the catalyst that is spent insofar as activity for isomerization is concerned is employed to dry and purify the feed hydrocarbons. This spent catalyst possesses adsorbent properties and contains aluminum chloride. By contacting the feed hydrocarbons with the catalyst the impurities such as moisture and olefins are removed so that on coming into contact with the catalyst in the first reaction zone the hydrocarbons do not rapidly destroy its activity. Further, if the feed hydrocarbons contain water this water reacts with the aluminum chloride to form hydrogen chloride which acts as a promoter for the reaction, thus reducing the amount of promoter required. Moreover, by proceeding in this way disposal of the spent catalyst is simplified. The spent catalyst is acidic in nature and presents a disposal problem. When the feed hydrocarbons contain moisture, the acidity of the catalyst is reduced and it may be disposed of with less difficulty.

The use of the spent catalyst for purifying the feed hydrocarbons is particularly important in the present process because the hydrocarbons come first into contact with relatively active catalyst and it is desirable that the activity of this catalyst should not rapidly be reduced and disrupt the activity relationship among the catalyst in the several zones. Accordingly, it is desirable that the feed hydrocarbons should be substantially free from impurities.

In general the conditions of operation of the present process are not substantially different from the conditions which have been proposed previously. For example, the temperature may vary from 150° to 250° F. or higher and the contact time may vary from one to fifteen minutes. It is preferred, however, to employ a temperature of 210° to 230° F. and a contact time of one to five minutes, especially about 2.5 minutes. As indicated above, the temperature is preferably controlled so as to maintain the lowest temperature in the first reaction zone and the highest temperature in the last zone. For example, where three zones are employed, the inlet temperature in the first zone may be about 210° F. and the temperature may be permitted to rise up to 10° F. in each of the zones; the total temperature rise, however, being about 20° F. and the outlet temperature being about 230° F. The space velocity, expressed under conditions at 60° F. as the ratio between the volume of the liquid charge and volume of catalyst, is also subject to variation, although it is generally desirable to regulate this factor so as to give a contact time of 1 to 5 minutes. Where the catalyst is 6 to 8 mesh activated alumina impregnated with aluminum chloride, the space velocity may vary from about 1.25 to 0.25 and is preferably about 0.5.

Although the pressure may be varied, it is generally preferred to carry out vapor phase operations at pressures not substantially lower than the highest pressure at which the hydrocarbons can exist as vapors at the reaction temperature.

The highest concentration of promoter (i. e., the concentration reached in the last zone) may also be varied within relatively wide limits depending upon the temperature maintained, the specific type of catalyst employed, the structure of the reaction vessel and other factors. In general, where hydrocarbon chloride is employed as the promoter it is unnecessary to have the highest promoter concentration above that corresponding to 15 per cent by weight of the feed hydrocarbons and usually this concentration will be considerably less than this amount. As the process is operated and the activity of the catalyst in the several zones is reduced it may be desirable to increase the concentration of promoter in each of the zones, although still proportioning the total amount of promoter among the zones in accordance with the relative activity of the catalyst contained therein.

In the accompanying drawing there is disclosed a flow diagram illustrating one manner in which the present process may be carried out. Since the process preferably is employed for converting normal butane to isobutane the flow diagram will be described in connection with this operation. Referring to the drawing, normal butane is forced into the system through line 1 by means of pump 2, and passes into heater 3 where it is heated to a conversion temperature and is vaporized under the existing pressure conditions. The vaporized normal butane is then passed into line 4. A line 5 leads into this line for introducing a promoter, hydrogen chloride in this case, into the vapors. The vapors are then passed through one of the two purifiers, 6 and 7, which contain spent catalyst which acts to remove moisture and olefins from the vapors and also to form additional hydrogen chloride. One of these purifiers is used at a time, the other being in the process of being filled with spent catalyst.

From the purifiers the butane vapors are passed into line 8 leading to a series of reaction chambers A, B, C, and D. These chambers are arranged so that the vapors may pass first into any one of the four. However, the operation will first be described at a time when the most active catalyst is in chamber A, chambers B and C contain catalyst of decreasing activity, and chamber D is out of line. Ordinarily, one chamber will not be in use but will be cut out in order to regenerate or replace the catalyst. Under the conditions outlined the vapors will pass from line 8 into lines 9a and 10a and thence into chamber A. The conditions are maintained so that the reaction begins in this chamber at a temperature of about 210° F. As described above, the promoter concentration in this chamber is low, the particular concentration depending upon the activity of the catalyst. Generally when a relatively new catalyst is employed, the hydrogen chloride concentration will be less than 2 per cent by weight of the feed hydrocarbons.

The vapors pass through the catalyst in chamber A and are partially converted to isobutane. Since the reaction is exothermic in nature, the temperature of the vapors is raised. The vapors are passed into line 11a and then into line 10b leading to chamber B. They pass upwardly through this chamber, through lines 11b and 10c, then through chamber C, wherein the conversion is completed to the desired extent, and finally leave the series of reaction chambers through lines 11C and 12C, as will presently be described.

As shown in the drawing, there are lines 13b, 14b, 13c, and 14c which lead into lines 10b and 10c, respectively. In the operation of the process, the vapors leaving chamber A will normally be at a temperature above that at which the reaction in chamber B is preferably carried out. There is introduced through line 13b an amount of cool normal butane to adjust the temperature to a point which is preferably below 220° F. Also, to compensate for the lower activity of the catalyst in chamber B, additional hydrogen chloride is introduced into the vapor stream through line 14b. The amount of hydrogen chloride introduced at this point will of course depend upon the activity of the catalyst and the amount of conversion accomplished in chamber A. By way of example, the hydrogen chloride introduced at this point may constitute about one-third of the total used. Similarly, the lines 13c and 14c conduct cool normal butane and hydrogen chloride into the vapors passing through line 10c. In this case the temperature is preferably adjusted so as to be below 230° F., and the remainder of the hydrogen chloride to be used, which may also be about one-third of the total, is introduced. Thus the total amount of promoter used is proportioned among the chambers so as to regulate the activity of the catalyst.

As stated above, in the operation described, the chamber D is cut out of the system. The operation is continued until the catalyst in chamber C is substantially spent. In this connection, as the operation is continued the activity of the catalysts in chambers A, B, and C will decrease and in many cases it is desirable to compensate for this by increasing the total amount of promoter used, although generally introducing the same proportion of the total into each of the vapor streams. As the decline in activity of the catalyst continues, it may be desirable for a time to maintain the temperature and promoter concentration in each zone at a maximum. Meanwhile, the catalyst in chamber D has either been regenerated or replaced and the catalyst in this chamber is more active than that in chamber A. The flow is therefore changed by manipulation of the valves shown, although not specifically described, so as to cut chamber C out of the system and to pass the feed hydrocarbons first into chamber D and then into chamber A and chamber B. The flow in this case is from line 8, to line 9d, through chamber D, lines 11d and 10a, chamber A, lines 11a and 10b, chamber B, line 11b, and thence out of the series of chambers through line 12b. Similarly, any of the other chambers may be first in line and the operation does not differ from that described.

Returning now to the description of the operation in which chambers A, B, and C are used, the vapors in line 12c contain sublimed aluminum chloride, and may be substantially saturated with this salt so that upon even slightly cooling the vapors, condensation of this salt occurs. At the existing temperature, the salt would tend to react with the vapors and cause over-reaction and even coking. Thus, the pipes and other equipment would tend to become clogged not only with the deposited salt but also with products formed by the reaction of the salt with the vapors. To avoid this, in the apparatus shown there is disposed in line 12c a nozzle arrangement 15c, or other mixing device. Leading into element 15c is line 16c connected to line 17. Line 16c conducts cool liquid normal butane into the vapors in amount such that the total liquid present, including the normal butane and the hydrocarbons condensed from the vapors, is sufficient to dissolve the sublimed aluminum chloride contained in the vapors. It will be noted that there is only a short vapor line before the introduction of the liquid butane. This is provided because it is important to effect the solution of the aluminum chloride before any condensation can occur. Where any drop in temperature is likely to occur, the vapor lines should be provided with means to prevent cooling, or the introduction of the liquid hydrocarbon should be made immediately on removing the reaction products from the reactor.

The products pass into line 18, leading to cooler 19 where condensation and cooling is completed. For example, the temperature may be reduced to 50° to 60° F. in the cooler. The fluid products are then passed through line 20 and into a stripper or fractionator 21. The stripper is operated so as to separate hydrogen chloride and lighter gases which pass into line 22 controlled by valve 23. A portion of these gases is bled off through line 24, and the remainder is recycled through line 5 to the normal butane entering the system through line 4, and through lines 14b and 14c to the vapors passing in lines 10b and 10c. It is noted that fresh hydrogen chloride may be introduced into the system through line 25.

From the bottom of the stripper 21 the liquid products are conducted through lines 27 and 28 or 29 to one of two caustic scrubbers 30 and 31. In the scrubber the aluminum chloride and remaining hydrogen chloride are removed and the products are passed through line 32 or line 33 and line 34 and into fractionator 35. The products are separated into a fraction consisting largely of isobutane and a fraction comprising normal butane and heavier hydrocarbons. The isobutane is removed from the system, condensed and passed to storage. The latter fraction is removed from the bottom of the fractionator through line 36 and into the stripper or fractionator 37 wherein the heavier hydrocarbons, which are normally formed to a small extent in the conversion reaction, are separated and removed from the normal butane. The normal butane is passed through line 38 and into cooler 39 where it is cooled and preferably liquefied. From the cooler, a portion of the butane is recycled through line 17, which is provided with a pump 40, and this portion is employed as described above for cooling the reaction products and preventing condensation of sublimed aluminum chloride. The remainder of the butane is passed into line 41, which is provided with a pump 42, and in part is returned to inlet line 1 to furnish makeup for the process. A portion of this normal butane is passed through line 43 leading to manifold line 44. Line 44 is connected to lines 13a, 13b, 13c and 13d which serve to conduct the normal butane into the lines between the reaction chambers as described above.

The process is described as being operated with three reaction chambers but it will be understood that more or less than this number of chambers may be employed if desired. Also the process may be operated with the use of reaction zones disposed in a single tower. In this case the operation of the process is not materially different from that described. For preventing the deposition of sublimed aluminum chloride on cooling it is preferred to use recycled hydrocarbons as disclosed, but it will be understood that other liquid hydrocarbons may be used if desired; for example, the feed hydrocarbons may be used for this purpose. Also, other hydrocarbons may be used for effecting cooling between reaction zones and for this purpose the feed hydrocarbon may likewise be used. Where feed hydrocarbons are used for these purposes, the part used may be by-passed around the heater.

The preferred catalyst consisting of alumina impregnated with aluminum chloride may be prepared efficiently by impregnating 6 to 8 mesh lumps of activated alumina with sublimed aluminum chloride until the catalyst contains about 17 to 18 per cent by weight of aluminum chloride, taking care by regulating the temperature that the aluminum chloride is adsorbed rather than condensed on the alumina.

Since changes may be made in the processes described above without departing from the scope of the invention, it is intended that the description shall be interpreted as illustrative and not in a limiting sense.

We claim:

1. In a continuous process of isomerizing hydrocarbons by contact with an isomerization catalyst in the presence of a promoter for the catalyst wherein a stream of hydrocarbons undergoing isomerization passes through a plurality of reaction zones in series, each of said zones containing said catalyst, the steps comprising maintaining more active catalyst in the initial zone and less active catalyst in the final zone of said series, passing said hydrocarbon stream through the series in order of decreasing catalyst activity, maintaining each zone under isomerizing conditions, and increasing the concentration of promoter in said stream of hydrocarbons as it advances through the succeeding zones, the concentration of promoter in the initial zone being less than that in a succeeding zone.

2. The process according to claim 1 in which the catalyst is aluminum halide and the promoter is hydrogen halide.

3. In a continuous process of isomerizing hydrocarbons by contact with an isomerization catalyst in the presence of a promoter for the catalyst wherein a stream of hydrocarbons undergoing isomerization passes through a plurality of reaction zones in series, each of said zones containing said catalyst, the steps comprising maintaining more active catalyst in the initial zone and less active catalyst in the final zone of said series, passing said hydrocarbon stream through the series in order of decreasing catalyst activity, maintaining each zone under isomerizing conditions, increasing the concentration of promoter in said stream of hydrocarbons as it advances through the succeeding zones, the concentration of promoter in the initial zone being less than that in a succeeding zone, and commingling fresh feed hydrocarbon with the stream passing between zones to thereby control the temperature in a succeeding zone.

4. In a continuous process of isomerizing normal butane by contact with an isomerization catalyst in the presence of a promoter for the catalyst wherein a stream of hydrocarbons undergoing isomerization passes through a plurality of reaction zones in series, each of said zones containing said catalyst, the steps comprising maintaining more active catalyst in the initial zone and less active catalyst in the final zone of said series, passing a stream of normal butane through the series in order of decreasing catalyst activity, maintaining each zone at a temperature in the range 150 to 250° F., increasing the concentration of promoter in said stream of normal butane as it advances through the succeeding zones, the concentration of promoter in the initial zone being less than that in a succeeding zone, and commingling fresh feed hydrocarbon with the stream passing between zones to thereby control the temperature in a succeeding zone.

5. In a continuous process of isomerizing normal butane by contact with an aluminum halide isomerization catalyst in the presence of a hydrogen halide promoter for the catalyst wherein a stream of hydrocarbons undergoing isomerization passes through a plurality of reaction zones in series, each of said zones containing said catalyst, the steps comprising maintaining more active catalyst in the initial zone and less active catalyst in the final zone of said series, passing a stream of normal butane through the series in order of decreasing catalyst activity, maintaining each zone under isomerizing conditions, the initial zone being at a temperature of about 210° F. and the final zone at a temperature of about 230° F., increasing the concentration of hydrogen halide promoter in said stream of butane as it advances through the succeeding zones, the concentration of hydrogen halide in the initial zone being less than about 2% by weight of the butane, and commingling fresh normal butane feed with the hydrocarbon stream passing between zones to thereby control the temperature in a succeeding zone.

HALSTED R. WARRICK.
CLAUDE W. WATSON.